L. W. BEER.
LAND ROLLER.
APPLICATION FILED SEPT. 11, 1913.

1,103,929.

Patented July 21, 1914.
2 SHEETS—SHEET 1.

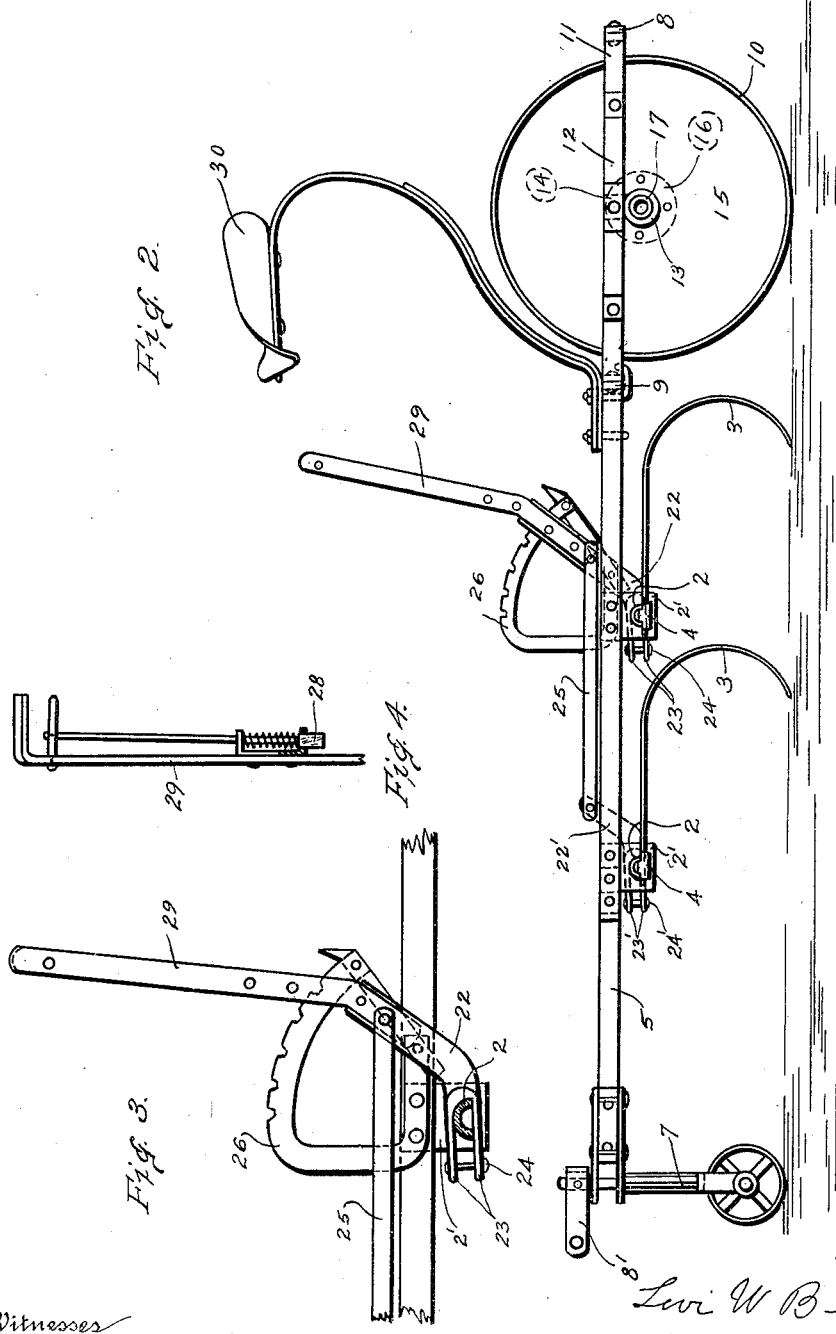

UNITED STATES PATENT OFFICE.

LEVI W. BEER, OF EAST MANSFIELD, OHIO.

LAND-ROLLER.

1,103,929.  Specification of Letters Patent.  Patented July 21, 1914.

Application filed September 11, 1913. Serial No. 789,276.

*To all whom it may concern:*

Be it known that I, LEVI W. BEER, a citizen of the United States of America, residing at East Mansfield, in the county of Richland and State of Ohio, have invented certain new and useful Improvements in Land-Rollers, of which the following is a specification.

This invention relates to certain new and useful improvements in combined harrows and rollers, in which the two devices are connected for simultaneous operation.

It is well known to those skilled in the art, that after the soil is harrowed, it is customary to roll same for the purpose of smoothing the ground. Where horse-propelled implements are used for the purpose of harrowing and rolling the soil, deep impressions are made in the soil by the horses, which impressions cannot be effectively smoothed out by the roller, which results in leaving the bottoms of the depressions hard and preventing the seed from entering the soil, with the result that a loss of seed is had. It is obvious, however, that if the depressions are harrowed and covered with soil, and then rolled, a smooth and uniform surface will be provided which is receptive for the seed, and which also uniformly nourishes the seed.

It is the object therefore, of the present invention, to so arrange and combine a harrow and roller that the soil will be thoroughly and uniformly harrowed to eliminate the depressions made by the horses' hoofs prior to rolling of the soil.

The further object of the invention is to provide an improved structure for supporting the rollers, to not only permit the latter to rotate independently of each other, but to also eliminate the usual long shaft employed to support the rollers.

Still further the invention aims to provide means which will effectively hold the journal boxes of the rollers against rocking movement, and to also provide an improved connection between the adjacent journals of a pair of rollers, which is simple, economical, and compact.

Figure 1:
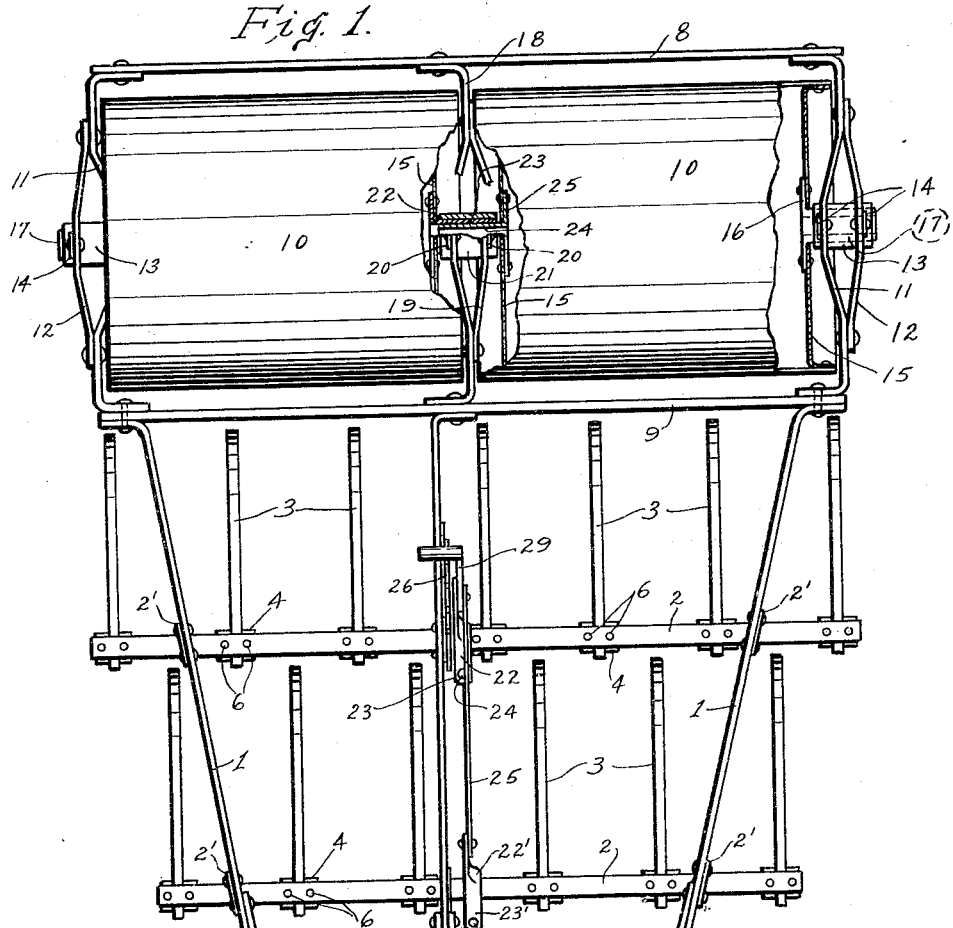
Figure 5:
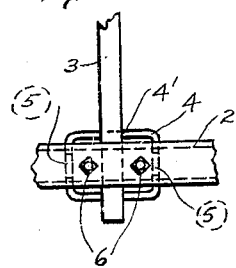
Figure 6:
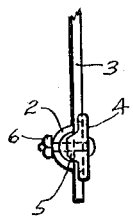

In the drawings: Figure 1 is a top plan view of the invention, parts being broken away and shown in section; Fig. 2 is a side elevation; Fig. 3 is an enlarged fragmentary side elevation, partly in section, of the hand lever device for raising and lowering the harrow teeth; Fig. 4 is an end elevation of Fig. 3; Fig. 5 is a fragmentary detail view of the harrow tooth clamping means; and Fig. 6 is an end view of Fig. 5.

Referring more specifically to the drawings, a harrow frame 1, is provided with transverse bars 2 movably supported by hangers 2', to which bars the harrow teeth 3 are secured. The bars 2 are of channeled or U-form as shown in Fig. 6, the teeth 3 being engaged with the free edges of the legs of the U, clamps 4 seating on the opposite faces of the teeth 3 and having end projections 5 which extend into the space between the legs of the U, bolts 6 being passed through the clamps 4 on opposite sides of the teeth 3 and through the connecting portion of the U to securely fasten the teeth in position. As shown in Fig. 5 of the drawings, the clamps 4 are substantially of rectangular outline and are held against lateral movement by the end projections 5 which engage the legs of the U bars 2. The clamps are also provided with recesses 4' in which the shanks of the harrow teeth are received. The forward end 5 of the harrow frame is supported by a fore truck 7 the latter having a clevis 8' to receive a tongue (not shown).

A substantially U-shaped frame 8 has the free extremities of its legs secured to the rear end 9 of the harrow frame 1, and, with said rear end 9 forms a substantially rectangular open frame to receive and surround the rollers or drums 10. The legs or ends of the frame 8 are formed of two strips 11 and 12 which are spread apart to provide an opening. Journal boxes 13 are attached to the strips 11 and 12 by means of ears 14 which latter are secured to the journal boxes and to said strips. The drums 10 are of hollow structure and have their ends closed by means of heads 15 which latter are riveted in position. The outer heads 15 have central disks 16 attached thereto, which disks have axles 17 connected thereto, the axles being received in the journal boxes 13.

For the purpose of supporting the adjacent inner ends of the drums to allow same to rotate independently of each other, the following means is provided: A cross bar or strip 18 has its ends connected to the end 9 of frame 1 and to the rear side of the frame 8, a short strip 19 being in turn attached to the strip 18. The central portions of the strips 18 and 19 are spread apart and have ears 20 of a journal box 21 connected thereto. A disk 22 is riveted to the inner head of one of the drums and has a tubular part 23 projecting outwardly therefrom, the tubular part 23 telescopically receiving a tubular part 24 formed on a disk 25 that is riveted to the inner head of the other drum. The tubular part 24 is received in the journal box 21. By spreading the parts 11 and 12 and 18 and 19 respectively, the journal boxes 13 and 21 respectively are reliably and effectively supported against any possible rocking tendencies, since the ears 14 and 20 respectively which support the journal boxes are engaged with the ends of the latter and the boxes are thus held at comparative remotely spaced points, whereas were the boxes supported at closely associated points, they would obviously tend to rock. In addition the spreading of the parts 11 and 12 and 18 and 19, increases the strength of the drum frame. The tubular parts 23 and 24 provide journals for the respective drums 10 and allow same to independently rotate, and at the same time allow the journals to be compactly related without sacrificing strength and efficiency. Crank arms 22' have bifurcated ends which form spaced arms 23', the latter receiving the bars 2 and being clamped thereto by bolts 24'. The cranks 22' are connected by means of a connecting rod 25' whereby the cranks and thereby the tooth carrying bars will be actuated in unison to raise and lower the teeth. A segmental rack 26 is attached to a central member 27 which latter connects the front and rear ends of the harrow frame, the teeth of the rack being for engagement with the spring pressed sliding latch or bolt 28 which is carried by the hand lever 29, the latter being connected to the rearmost of the two cranks 22'. A spring seat 30 is suitably attached to the harrow frame to support the driver.

What is claimed is:

1. In combination with a support, a substantially U-shaped frame having the free ends of the legs thereof secured to the rear end of the support, a central member connected to the rear side of the U-frame and to the rear end of the support and a pair of rollers journaled in the legs of the U-frame and having telescopic portions projecting through said central member.

2. In a land roller, a frame having end members and a central member each of which are formed of a pair of connected members spread apart at their centers, a journal box for each end and said central member, a pair of ears carried by each journal box and being connected to the respective members of the frame ends and central member, a pair of rollers having journals on their outer ends which are received in the boxes of the frame ends, and a pair of telescoping tubular parts on the confronting inner ends of the rollers, the outer of which tubular part is received in the journal box of the central member.

3. In a land roller, a roller frame, a pair of outer and a central journal box secured to the frame, a pair of rollers having outer journals received in said outer boxes, and telescopic journals carried by the inner ends of the rollers and engaged in said central box.

4. In a land roller, a roller frame, a pair of rollers journaled at their outer ends to the frame, telescopic journals on the inner ends of the rollers, and means to support said telescopic journals common to both of the latter and surrounding same.

5. In combination with a frame, a pair of rollers journaled at their outer ends to the frame, telescopic journals on the inner ends of the rollers, and means to support said telescopic journals common to both of the latter and engaged with the exterior of the outermost journal.

In testimony whereof I affix my signature in presence of two witnesses.

LEVI W. BEER.

Witnesses:
 PEARL YUNCKER,
 Mrs. J. H. Coss.

---

Copies of this patent may be obtained for five cents each, by addressing the "Commissioner of Patents Washington, D. C."